April 22, 1969  J. BRAUN  3,440,457
METHOD AND APPARATUS FOR MAGNETO-HYDRODYNAMIC
ELECTRIC POWER GENERATION
Filed Dec. 17, 1964
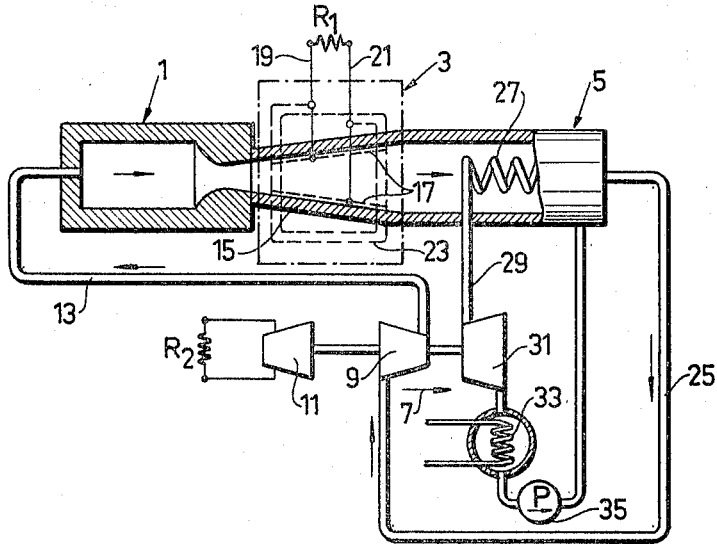
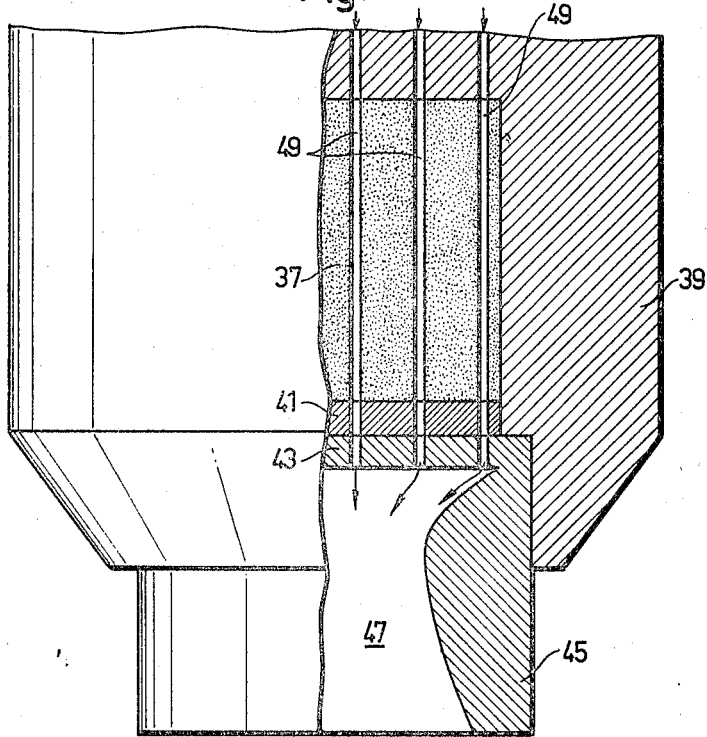
INVENTOR
Josef Braun
BY Pierce, Scheffler & Parker
ATTORNEYS

| United States Patent Office | 3,440,457
Patented Apr. 22, 1969 |
|---|---|

3,440,457
METHOD AND APPARATUS FOR MAGNETO - HYDRODYNAMIC ELECTRIC POWER GENERATION
Josef Braun, Nykoping, Sweden, assignor to Aktiebolaget Atomenergi, Stockholm, Sweden, a company of Sweden
Filed Dec. 17, 1964, Ser. No. 418,956
Claims priority, application Sweden, Dec. 20, 1963, 14,381/63
Int. Cl. H02k 45/00; G21d 7/02
U.S. Cl. 310—11                10 Claims

ABSTRACT OF THE DISCLOSURE

A magneto-hydrodynamic power plant of the closed cycle type comprises an MHD duct through which a hot ionized gas is passed to directly generate an electrical power output. A portion of the thermal energy in the hot ionized gas also passes through a heat exchanger to produce steam for driving a steam turbine coupled to a compressor and a conventional rotary type electric generator for using up the remainder of the energy. The compressor compresses the gases exhausted from the MHD duct and recirculates them to a reactor for reheating and thence re-entry to the MHD duct to initiate a new cycle. A noble gas such as $He^4$ having an additive of $He^3$ or $Li^6$ or $B^{10}$ or a mixture of two or more of these to serve as an ionizing substance is passed through cooling ducts in the reactor core where it is reheated by fast neutrons and thence through an ionizing zone of thermal or epithermal neutrons, the now re-heated and ionized gas then being passed to the inlet end of the MHD duct.

The present invention relates to a method and an apparatus for magneto-hydrodynamic electric power generation.

Many attempts have been made to solve the problem of directly converting thermal energy to electric energy without the use of moving parts. This problem is of current interest in nuclear engineering. Such a method would involve great advantages as compared to conventional methods, that is by means of steam turbines, and the like. Among the methods considered the so-called magneto-hydrodynamic method (MHD) is regarded to be the most promising at present. Electric current can be produced with MHD according to the same principles as in a conventional electric generator, the conductor movable in the magnetic field being replaced by a flow of ionized gas or plasma. In principle an MHD-generator consists of a gas duct surrounded by magnets generating a magnetic field in the duct and electrodes positioned apart on each side of the flow path of the gas in the duct.

Ionized gas or plasma can be obtained in several ways, for instance by thermal ionization at high temperatures or by supplying extraneous energy. The disadvantage of thermal ionization is the high temperature required for obtaining a satisfactory ionization, the temperature putting great demands as to the material of the duct, the electrodes, etc. of the MHD-generator.

Attempts have been made to utilize the hot coolant gas from gas-cooled reactors for the operation of MHD-generators. In this case normally the reactor has been used as a source of heat only, the ionization of hot gas being carried out in the generator itself. One has also tried to use the reactor for the ionization. However, it must be considered to be out of question at present to provide thermo ionization in a nuclear reactor in view of the high temperature necessary therefor. Furthermore, calculations have shown, that the ionizing capacity of the $\beta$- and $\gamma$-radiation of the fission products is too small. It is possible to utilize the kinetic energy of the fission products for the ionization of the gas, but then a fissile material must be added to the coolant gas, which is considered to be unrealizable in view of the technical problems, which then arise.

Accordingly, it is a general object of the invention to provide an improved magneto-hydrodynamic electric power generation process.

One of the particular objects is to provide a method for generating an ionized gas having a high density of volume charge.

Another object is to provide a gas containing at least one substance, which when subjected to neutron irradiation is energized so as to ionize the gas.

Another object is to add an activating substance to the gas, whereby the ionization is increased. Another object is to add an activating substance to the gas, whereby the recombination is decreased.

It is also an object of the invention to provide an apparatus for producing electric power.

A particular object is to provide an apparatus comprising in combination a nuclear reactor and a magneto-hydrodynamic generator.

In the method of producing electric power by the magneto-hydrodynamic process by passing an ionized gas through a magnetic field, the present invention relates to the improvement comprising ionizing the gas by passing it through a neutron irradiation zone, the gas containing at least one ionizing substance capable of reacting inelastically with neutrons to form charged particles having an energy sufficient for ionizing the gas. The gas may be ionized by passing it through a nuclear reactor. The gas may be coolant gas of a gas cooled nuclear reactor. According to a particular embodiment of the method of this invention the gas is heated by passing it through a heating zone of fast neutrons and subsequently ionized by passing it through an ionizing zone of thermal or epithermal neutrons. The gas may consist of a noble gas, for instance $He^4$, said substance being added in small amounts. According to another embodiment of the method of the invention an activating substance, for instance cesium or argon, is added to the gas, whereby the ionization is increased and/or the recombination is decreased. As an ionizing substance the gas may contain $He^3$, $Li^6$ or $B^{10}$ or a mixture of two or more of these. An inelastic nuclear reaction is herein referred to as a reaction, in which the neutron is amalgamated with the nucleus to be reacted, under the formation of a new nucleus, which can then release its energy, for instance, in the form of $\gamma$-radiation, or by being split into charged particles etc.

The apparatus according to the invention comprises in one embodiment a heating zone of fast neutrons, an ionizing zone of thermal or epithermal neutrons, and means for passing the gas through said heating zone and subsequently through said ionizing zone and finally to the magneto-hydrodynamic generator. According to a particular embodiment of the invention the apparatus comprises a fast nuclear reactor including a reactor core, a reflector surrounding said core on all sides except the outlet side, a buffer layer and outside thereof a moderator layer, said layers being arranged at the outlet side of the reactor, and gas ducts extending through said reflector, said core and said layers for passing the gas through the reactor, and a means for passing the gas from the reactor to the magneto-hydrodynamic generator, which means consists of a duct surrounded by a moderator.

The objects and various advantages of the invention will be apparent from the following description of an exemplary embodiment, reference being made to the accompanying drawing wherein:

FIG. 1 outlines a plant for the generation of electric energy, and

FIG. 2 is a detailed view of the reactor part of FIG. 1 partly in section.

In principle the plant of FIG. 1 comprises a reactor part 1, a magneto-hydrodynamic part 3, a heat exchanger part 5, and in connection therewith a turbine part 7 with a compressor 9 and a generator 11. The reactor 1 to be further described below is cooled with a noble gas, for instance He$^4$, which is supplied to the reactor through a conduit 13. A magneto-hydrodynamic generator (MHD-generator) is connected with the outlet side of the reactor. The magneto-hydrodynamic generator comprises a duct 15 for the flow of the gas through the generator, electrode systems 17 placed at the walls of the duct 15 diametrically opposed, the electrode systems being connected with a load R$^1$, and a magnet for generating a magnetic field, which is schematically indicated in FIG. 1 by magnet windings 23 with dashed lines. As shown, the magnetic windings 23 are connected with the conductors 19, 21, and the generation of the magnetic field is thus effected by a part of the current generated in the magneto-hydrodynamic generator. From the magneto-hydrodynamic generator the gas is passed through a heat exchanger 5, where the gas is cooled, and is then by conduit 25, the compressor 9 and the conduit 13 recirculated to the inlet side of the reactor 1. The heat of the gas is transferred to the water in a coil 27 in the heat exchanger 5, where steam is generated, which by a conduit 29 is led to a turbine 31. The outlet steam from the turbine 31 is passed to a condenser 33 and is resupplied to the coil 27 of the heat exchanger 5 by a pump 35. The turbine 31 drives a compressor 9 and a generator 11, which is connected with a load R$^2$.

The design of the reactor part 1 is shown more in detail in FIG. 2. The reactor is a so-called fast reactor, that is the fission is brought about by fast neutrons, and the reactor comprises a reactor core 37, which on all sides except for the outlet side is surrounded by a reflector 39 of uranium. In the lower part of the reactor core 37, that is at the outlet side, a buffer layer 41 is arranged, which also may consist of uranium. Below or outside the buffer layer 41 a moderator layer 43 is arranged, the peripheral part of which all around is axially extended downwardly forming the wall 45 of a duct 47, the lower part of the wall 45 being connected with the magneto-hydrodynamic generator described in connection with FIG. 1. The moderator material of layer 43 and wall 45 may for instance be graphite. Vertical coolant ducts 49, three of which are shown in the figure, extend through the upper part of the reflector 39 at the inlet side of the reactor, the reactor core 37, the buffer layer 41, and the moderator layer 43 and open into the duct 47.

The operation of the apparatus outlined above will now be described in connection with the drawing, He$^3$ being used as a substance for the ionization. He$^3$ reacts with thermal and epithermal neutrons, that is neutrons in the energy range of 10$^{-2}$ to 10$^5$ ev., thus

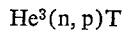
$$He^3(n, p)T$$

Neutrons of higher energies have a negligible influence. The preponderance of the active neutron energy is determined by the design of the reactor. The reaction means that He$^3$ takes up a neutron under the formation of a compound nucleus, which then disintegrates to a protone and a tritone. The reaction is exothermic and the energies of the protone and the tritium particles are 0.6 and 0.2 mev. respectively. By the retardation of said particles the coolant gas, in this case consisting of He$^4$, is ionized. The density of volume charge being obtainable in the coolant gas is limited by the fact, that the amount of added He$^3$ must not be so large so as to influence the economy or the operational characteristic of the reactor.

It has been found, that with the use of a noble gas as a coolant gas and He$^3$ as an additive a satisfactory density of volume charge is obtained in the gas without deleteriously influencing the characteristics of the reactor. Furthermore, the plasma has a sufficient lifetime for reaching the interior of the magnetohydrodynamic generator, before a too extensive recombination has taken place.

Now consider the operational conditions in the reactor part with reference to FIG. 2. The coolant gas consisting of He$^4$ and added He$^3$ is thus supplied to the reactor at its upper end or the inlet end (indicated with arrows in FIG. 2) and flows downwardly in the reactor through the cooling ducts 49. When passing through the reactor core 37 the coolant gas is heated, but as fast neutrons do not react with the added substance He$^3$, the coolant gas will not be ionized in this part of the reactor. Furthermore, the fact that fast neutrons do not react with He$^3$, makes possible, designing the coolant ducts in such a way, that an acceptable void coefficient as well as a satisfactory heat transfer can be obtained. Neutrons leaking out from the core meet the reflector 39 and are partly returned to the reactor core, the leakage being decreased.

The neutrons are retarded to thermal energies in the moderator 43, 45 and proceed into the duct 47. The purpose of the buffer layer 41 at the outlet side of the reactor core 37 is to isolate the core from thermal neutrons, so that a too extensive power concentration in the lowest part of the core is avoided. After the passage through the reactor core 37 the coolant gas flows through the buffer layer 41 and the moderator 43 in the coolant duct 49 into the duct 47, where He$^3$ reacts with thermal neutrons, the coolant gas then being ionized. It has been found suitable to provide the duct 47 with a constriction, so that the gas velocity in the duct is increased to a value which is necessary in the subsequent magneto-hydrodynamic generator. The reason for this is partly that it is desirable to decrease the time which elapses before the ionized gas reaches the interior of the magneto-hydrodynamic duct and partly that it is desirable to decrease the recombinational losses by increasing the electron temperature in relation to the surrounding gas. The wall 45 of the duct is thus designed as an ideal jet, that is a nozzle, in which the flow losses are negligible.

The gas flowing out from the lower part of the duct 47 is thus ionized and has preferably an electron density exceeding 10$^{11}$ e$^-$/cm.$^3$ and a stagnation temperature exceeding 1100° K. The stagnation temperature is the theoretical temperature, which is obtained if the gas is slowed down to stand-still without heat losses to the surroundings. By the passage through the magnetic field of the magneto-hydrodynamic generator an electromotive force is generated over the electrode systems 17, which is partly used for the generation of the magnetic field and the surplus energy is supplied to a load R$^1$. After the passage through the magneto-hydrodynamic generator the gas is passed on to the heat exchanger unit 5, where its heat content is transferred to the water in the coil 27. The water in the coil 27 is vaporized and flows in the form of steam through the conduit 29 to the turbine 31, which drives the compressor 9 and the generator 11. The outlet steam from the turbine 31 is condensed in the condenser 33, and the condensed water is recirculated to the coil 27 by the pump 35. The gas from the heat exchanger 5 flows through the conduit 25 and is compressed in the compressor 9 and passed on to the inlet side of the reactor 1.

Li$^6$ and B$^{10}$ can be used for the ionization besides He$^3$ and react with neutrons according to the equations:

Li$^6$(n, α)T and B$^{10}$(n, α)Li$^7$, respectively, the energies of the reactions being 4.8 and 2.8 mev., respectively. The ionization in the magneto-hydrodynamic duct may be increased by the same conditions as to temperature, pressure etc., if an activating substance, for instance cesium, which has a low potential of ionization, or argon, which can be ionized by collisions with for instance excited He³-atoms, the ionization being increased and/or the recombination being decreased. It is of course also possible to use any of the noble gases besides He⁴.

While one embodiment of the invention has been described for purposes of illustration it is to be understood that there may be various embodiments and modifications within the scope of the invention.

What is claimed is:

1. In the method of producing electric power by the magneto-hydrodynamic process by passing an ionized gas through a magnetic field, the improvement comprising ionizing the gas by passing it through a neutron irradiation zone, the gas containing at least one ionizing substance capable of reacting inelastically with neutrons to form charged particles having an energy sufficient for ionizing the gas.

2. A method as claimed in claim 1, comprising ionizing the gas by passing it through a nuclear reactor.

3. A method as claimed in claim 2, in which said gas is the coolant gas of a gas-cooled nuclear reactor.

4. A method as claimed in claim 1, in which the gas consists of a noble gas to which said substance is added in small amounts.

5. Method as claimed in claim 1, in which an activating substance is added to the gas, whereby the ionization is increased and/or the recombination is decreased.

6. A method as claimed in claim 1, in which the gas contains at least one member selected from the group consisting of $He^3$, $Li^6$ and $B^{10}$.

7. An apparatus for producing electric power, comprising in combination a nuclear reactor and a magneto-hydrodynamic generator, means for passing a gas through said reactor from an inlet side to an outlet side thereof, said gas containing at least one ionizing substance capable of reacting inelastically with neutrons to form charged particles having an energy sufficient for ionizing the gas, and means for passing the gas, thus ionized, from said outlet side to said magneto-hydrodynamic generator.

8. In the method of producing electric power by the magneto-hydrodynamic process by passing a hot ionized gas through a magnetic field, the improvement which comprises the steps of heating the gas by passing it through a heating zone of fast neutrons in a nuclear reactor and thence passing the heated gas through an ionizing zone in said reactor of thermal or epithermal neutrons.

9. An apparatus for producing electric power, comprising in combination a nuclear reactor having a gas heating zone of fast neutrons and an ionizing zone of thermal or epithermal neutrons, a magneto-hydrodynamic generator including a duct through which the hot ionized gas is passed for direct conversion of thermal energy of the gas into electrical energy, means connecting the outlet of said ionizing zone with the inlet end of said magneto-hydrodynamic duct, and means returning the gas from the discharge end of said duct to the gas heating zone of said nuclear reactor, said gas including at least one ionizing substance capable of reacting, inelastically with neutrons to form charged particles having an energy sufficient for ionizing the gas.

10. Apparatus as defined in claim 9 wherein said nuclear reactor includes a core, a reflector surrounding said core on all sides except for the outlet side, a buffer layer located adjacent the outlet side of said core, a moderator layer located adjacent said buffer layer, and gas ducts extending through said reflector, core and buffer and moderator layers for passing the gas through said reactor, said moderator layer including a tubular portion forming a duct for passing the gas from the reactor to the inlet end of said magneto-hydrodynamic duct.

References Cited

UNITED STATES PATENTS

| 3,149,248 | 9/1964 | Valfells | 310—11 |
| 3,283,183 | 11/1966 | Yano et al. | 310—11 |

OTHER REFERENCES

Nuclear Physics by Kaplan, 1955, publisher, Addison-Wesley, Reading, Mass.; pp. 228 and 229.

J. D. MILLER, *Primary Examiner.*

DAVID X. SLINEY, *Assistant Examiner.*